Patented Feb. 5, 1952

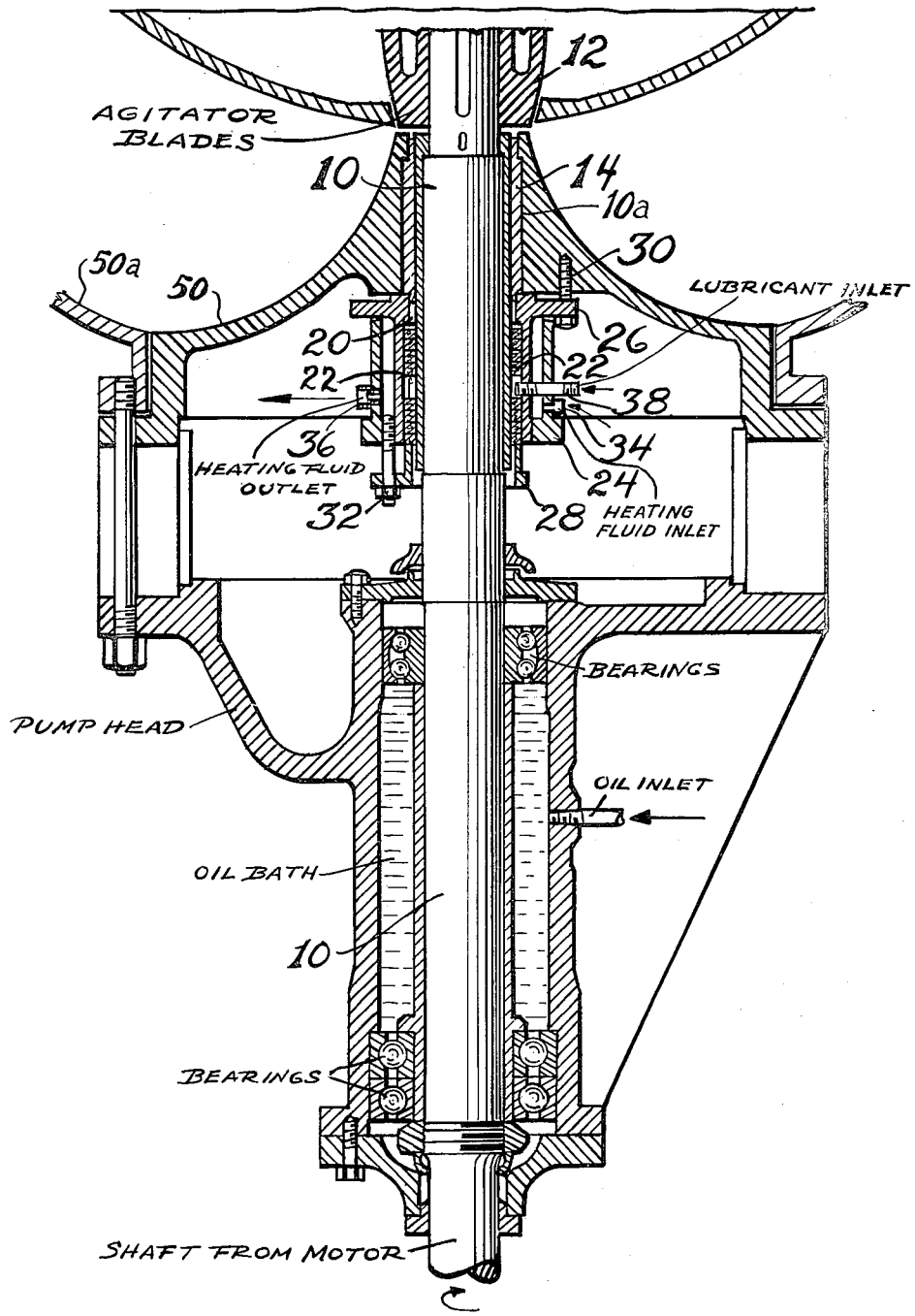

2,584,252

UNITED STATES PATENT OFFICE 2,584,252

PACKING GLAND

Valrie E. Bourgeois, Baton Rouge, La., assignor to Standard Oil Development Company, a corporation of Delaware Application December 21, 1945, Serial No. 636,486

2 Claims. (Cl. 308—36.1)

This invention relates to improved stuffing boxes for revolving shafts, and particularly to stuffing boxes for shafts exposed to temperature differentials.

The stuffing boxes for rotating shafts such as those employed in turbine and agitator constructions are required to be fluid-tight under a wide variation of conditions. It is particularly important in the case of constructions in which volatile or corrosive fluids are present to prevent leakage around the stuffing boxes. In the prior art, the means for preventing such fluid leakage has been to have a liquid seal or a diluting means around the shaft to nullify the dangerous effects of the leaking. In the present invention, the means for overcoming the dangerous effects of fluid leakage is the maintenance of conditions within the material of the stuffing box best suited for sealing. These conditions are maintained in the device of the present invention by suitable choice of the packing material, coupled with the use of a temperature at which the stuffing box material is most effective as a sealing material.

As a result of many recent chemical developments, equipment had to be designed for operation at low temperatures. The production of synthetic rubber and resinous material has made this requirement particularly necessary. Thus, synthetic rubber is commonly prepared by a low temperature polymerization of hydrocarbon materials. Temperatures as low as —200° F. are often employed in such operations. The conditions under which the synthetic materials are prepared also require considerable agitation at the low temperatures. The problem has thus been presented of maintaining agitation in low temperature systems. A critical construction feature in the equipment for such processing is the stuffing box which separates the low temperature reaction system from the means at atmospheric conditions by which control upon the temperature and the agitating mechanism is maintained. The present invention is particularly concerned with the construction of a stuffing gland which is effective as a seal for rotating shafts exposed to a range of temperature differentials such as those which occur in the chemical systems operating at low temperatures.

In the past, considerable difficulty has been experienced with a packing gland for the preparation of synthetic rubber. The gland which has been employed for some time was located near the reaction system. Under such conditions, the packing became frozen, hardened and stiff even during use. When the reactor was warmed up following a few hours' operation to remove polymer adhering to the walls of the reaction vessel, the temperature of the packing gland was also raised. This increase in temperature caused an excessive leakage of the contents from the reaction vessel. Numerous packing materials and greases were investigated to obtain satisfactory operation under the alternate cooling and heating conditions employed in such reaction systems; however, no packing was found that would give satisfactory performance at the extremely low operating temperatures. In the present invention, the packing gland previously located near the reaction system has been replaced with a bronzoid bearing. The stuffing gland of the present invention is located some distance from this bearing and thus some distance from the zone of low temperature operation. Coupled with this advantage of being removed from the low temperature area, additional features are the circulation of a heating medium in a jacket enclosing the packing gland in which the packing material is maintained at a temperature at which it is most effective as a sealing material.

The invention will be appreciated by reference to the following description and accompanying drawing. It is not intended, however, to limit the invention to the particular embodiment illustrated by this description and drawing since this invention has been successfully applied to other rotating shaft devices operating at low temperatures. The drawing presents a sectional elevational view of a stuffing gland for an agitator system employed in the preparation of synthetic rubber materials from unsaturated hydrocarbons at temperatures of around —150° F., the shaft of the agitator being operated from a motor at atmospheric conditions.

Thus, in the drawing, a shaft 10 is shown as making connection by way of shaftway 10a between a motor, not specifically shown, and the lower portion of the blades of an agitator, partly shown and designated by the numeral 12, in a reaction vessel 50 having an encompassing wall portion 50a. Located some distance from the low temperature zone in which the blades of the agitator 12 move is the packing gland designed according to the invention. Between the gland 20 and the agitator blades 12 is a bearing bushing 14 mounted in a shaftway 10a. The bearing-bushing is preferably of a bearing metal containing a major portion of copper and minor portions of lead and tin. The gland 20 consists of soft packing 22 confined within the inner wall of a separate, tubular, hollow walled jacket 24 and the upper and lower annular members 26 and 28 respectively. The annular member 26 is held in sealing engagement with the vessel 50 and the bearing-bushing 14 as by means such as the screw 30. The packing material is compressed between the member 26 and the member 28, and thus against the shaft, as by means such as the screw 32. The packing material 22 is usually a metallic packing with an asbestos core but may be any packing which would be designed for operating at the temperature maintained at the jacketed packing gland. The jacket 24 permits the circulation therethrough of a heating fluid for the heating of the packing material. The fluid passing through the jacket 24 may be water or a hydrocarbon liquid. The temperature maintained with asbestos in the specific embodiment is 80° F. by reason of the circulation of a hydrocarbon liquid of boiling range above that of kerosene. The heating fluid enters the jacket through line 34 and passes out through line 36. The shaft 10 may be lubricated by the injection of lubricant through line 38. Other easily controllable means of heating the packing material may be employed such as by an electric heating coil. When an electric heating coil is employed, elimination can be effected of the pump, piping and heat exchanger necessary when circulating the heating fluid.

In the preparation of butyl rubber from isobutylene and a diolefin at −150° F. in the presence of aluminum chloride in methyl chloride solution, a stuffing box such as previously described and illustrated was found considerably more advantageous than that of the packing gland located near the reaction system as formerly employed. The advantages of the packing gland of this invention are that (1) the packing material remains soft, pliable and at a uniform temperature during the entire cold and warm servicing cycles, thus minimizing the possibility of leakages and breakdowns; (2) the reactor operation is not retarded by the formation of hot spots in the reactor since the heating system employed for the packing gland is sufficiently removed from the low temperature area; (3) the maintenance is reduced considerably; and (4) catalyst injection time per run and average run length are increased. In this latter regard, the increase in average catalyst injection time per run has been found to be as follows, in comparison to that when a gland located near the reaction system and without a heating jacket was employed:

| Reactor | East | Middle | West |
|---|---|---|---|
| Number of Runs | 10 | 17 | 27 |
| Original Gland, Average Catalyst, Hours Per Run | 13.6 | 10.0 | 12.2 |
| Revised Gland, Average Catalyst, Hours Per Run | 21.4 | 13.4 | 21.6 |

Also, in the packing glands previously used, new packings had to be installed following each run and a complete repacking made subsequent to approximately six runs. With the stuffing gland of this invention, fourteen days' operation could be carried out without the addition of packing, and approximately forty-two days of operation before complete repacking.

What is claimed is:
1. In an apparatus for handling materials at low temperatures, including a low temperature zone having an encompassing wall, and a shaft extending into the zone through a shaftway in the wall, means for supporting said shaft substantially to compensate for the low temperature effect transmitted therethrough, comprising a bearing-bushing in the shaftway extending outwardly therebeyond and supporting one end of the shaft, a separate, tubular, hollow-walled, stuffing box having inner and outer annular end portions, encircling the shaft in radially spaced relation thereto, a soft packing material in the space between said stuffing box and the shaft, a gland member in the outer end portion of said stuffing box, including means for thereby compressing the packing material against said shaft, conduit means opening into and from the hollow wall of said stuffing box for circulating a heating fluid therethrough, means for securing the inner end of said stuffing box to the vessel wall in sealing engagement with the outwardly extending end of said bearing-bushing, and a bearing for the other end of said shaft supported in substantially spaced relation to the wall of said zone and to said stuffing box.

2. In an apparatus for handling materials at low temperatures, including a walled vessel to contain the materials, a shaftway opening through a wall of said vessel, a tubular bearing-bushing in said shaftway extending outwardly therebeyond, and a rotatable shaft extended into the vessel through said shaftway and bushing, a seal for said shaft and shaftway, comprising a separate, tubular, hollow-walled, stuffing box, having inner and outer annular, end portions, encircling the shaft in radially spaced relation thereto, a soft packing material in the space between said stuffing box and shaft, a gland member in the outer end portion of said stuffing box, including means for thereby compressing the packing material against said shaft, conduit means opening into and from the hollow wall of said stuffing box for circulating a heating fluid therethrough, and means for securing the inner end of said stuffing box to the vessel wall in sealing engagement with the outwardly extending end of said bearing-bushing.

VALRIE E. BOURGEOIS.

REFERENCES CITED

The following references are of record in the file of this patent:

UNITED STATES PATENTS

| Number | Name | Date |
|---|---|---|
| 686,737 | Josse | Nov. 19, 1901 |
| 1,808,353 | Jackson | June 2, 1931 |
| 1,879,774 | Temple | Sept. 27, 1932 |
| 2,131,927 | Wenzel | Oct. 4, 1938 |

FOREIGN PATENTS

| Number | Country | Date |
|---|---|---|
| 57,132 | Switzerland | 1911 |